May 4, 1965 K. B. GILLMORE 3,181,823
RESCUE SYSTEM
Filed Nov. 13, 1963 4 Sheets-Sheet 3

INVENTOR:
Kenneth B. Gillmore,
BY
ATTORNEYS.

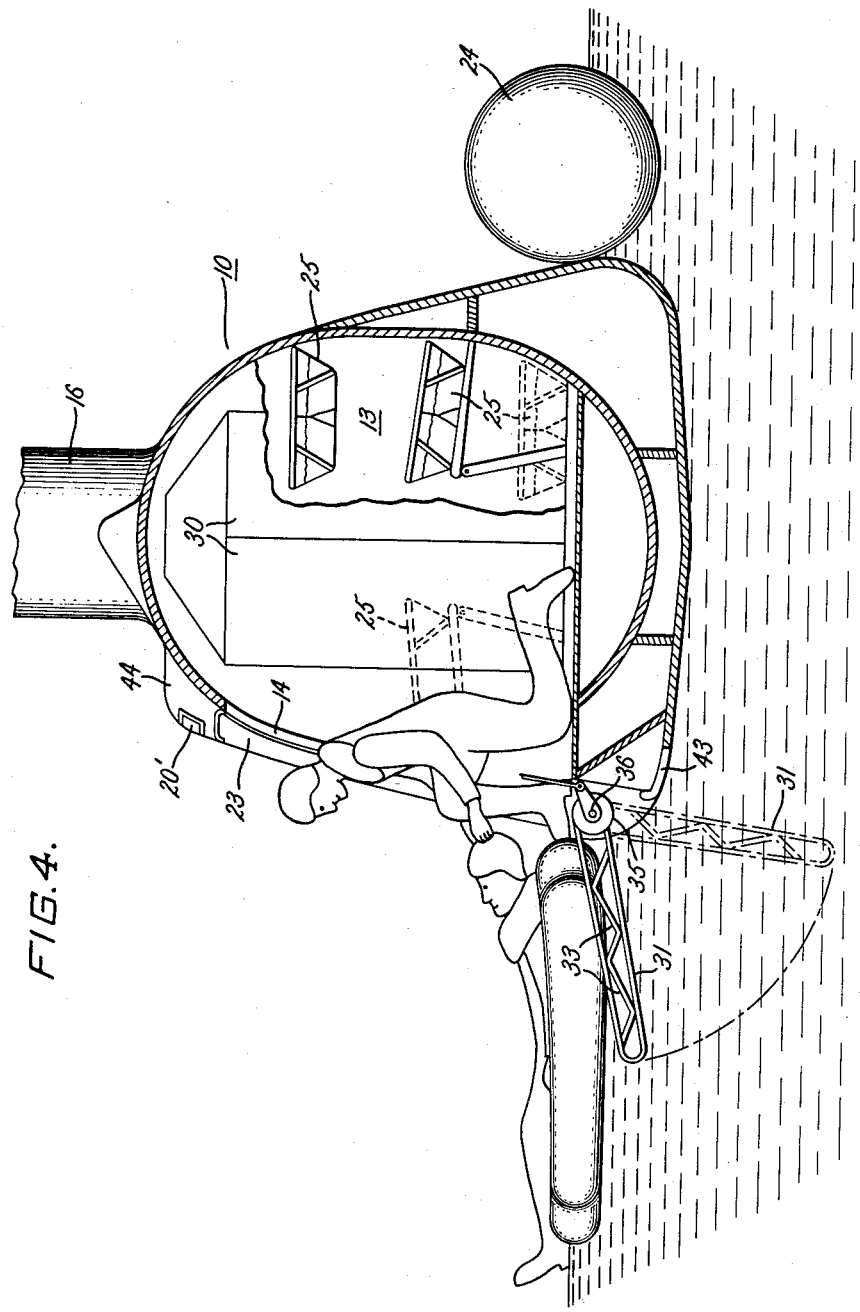

United States Patent Office 3,181,823
Patented May 4, 1965

3,181,823
RESCUE SYSTEM
Kenneth B. Gillmore, Havertown, Pa., assignor to The Boeing Company, Seattle, Wash., a corporation of Delaware
Filed Nov. 13, 1963, Ser. No. 323,326
16 Claims. (Cl. 244—137)

The present invention relates to a sea rescue system and more particularly to the structural modification necessary to give a sea vehicle the capability for open sea rescue.

It should be noted that the preferred environment for the rescue compartment is in a helicopter although the concept of a water tight rescue compartment having an access ramp capable of being used as a ladder or lifting platform might be utilized in any vehicle which is amphibious. For purpose of disclosing the invention, its use with a helicopter is described and illustrated.

Those concerned with providing rescue means in the open sea for downed flyers, shipwrecked sailors, and the like, have been searching for a satisfactory sea rescue system which provides the fastest and surest method of retrieving shipwrecked personnel. Preferably, the rescue system must allow a shipwrecked person to be brought aboard the rescue vehicle without having to be hooked and lifted from the water or picked up by a small craft, which craft, in turn, must be picked out of the water by the mother craft. Each of these methods consumes time and/or aggravates the injuries of the person being rescued.

The helicopter offers the solution to the high speed rescue need since it is capable of travelling at speeds over 150 knots and yet it may loiter in areas at 30 to 50 knots waiting to go into its rescue function. Also, its fuel consumption is very low which gives it a time-on-site capacity which enhances its desirability as a rescue vehicle. But, a drawback to the present helicopter as a rescue vehicle lies in the fact that rescue operations must be done by "hooking" the rescuee. That is, present helicopter operations are primarily confined to dropping horseshoe collars or baskets into the water into which the survivor must climb, or dropping personnel into the water who lift the injured survivor into the collar or basket, or dropping rafts and then picking the shipwrecked personnel off the rafts by means of the above mentioned collars or baskets. These systems leave much to be desired.

A recent feature of helicopter capabilities is their ability to land in and take off from water. This new feature offers the solution to the inherent drawbacks of the helicopter as a rescue vehicle if the sea worthiness characteristic can be utilized. And a successful system which exploits the capability of a helicopter to land beside the downed party and to pick him out of the water and fly him to medical aid offers the best presently known sea rescue medium. But, again, to have an effective pickup system for helicopters and, for that matter, all sea vehicles, the pickup of the survivors must be accomplished without having to throw hooks, collars, baskets, or ropes to the person in the water and, more specifically, the pickup system should be so arranged that it allows the person being rescued to enter the ship at water level. This minimizes aggravating or compounding the injuries which the rescuee has suffered, speeds up the taking on-board, requires fewer crew members on board the helicopter for the rescue, and allows uninjured personnel to readily enter the ship under their own power. It is these requirements that this invention seeks to satisfy.

This invention satisfies the above requirements and solves the above problems by providing a vehicle having sea capability with a water tight compartment at sea level by means of which a downed survivor can come aboard the rescue vehicle without having to be "hooked." A ramp is provided that can be dropped below the water level to act either as a ladder or as a rescue platform when the person is incapable of climbing into the water tight compartment under his own power. The survivor then can be brought aboard the rescue vehicle with a minimum of dragging and lifting.

An object of this invention is to supply a fast and efficient rescue system for sea rescue operations.

Another object of this invention is to provide a sea rescue system that enables the downed survivor to be brought aboard the rescue vehicle with a minimum of handling and lifting.

A further object of the invention is to provide a water tight compartment and a loading ramp which enables a survivor to enter the rescue vehicle at water level.

Still another object is to provide a rescue system for helicopters which makes feasible open sea rescue operations while the helicopter has landed on the water.

A still further object is to provide a fast yet simple method of rescue by allowing the helicopter to land in the water and to take, by direct pickup, an able bodied, injured, or unconscious survivor from the water.

Other objects and advantages of the invention will hereinafter become more fully apparent from the following description and drawings.

FIGURE 4 is a typical rescue operation scene in which the invention is utilized. The view is taken looking through the rescue compartment toward the main cabin.

Figure 1:
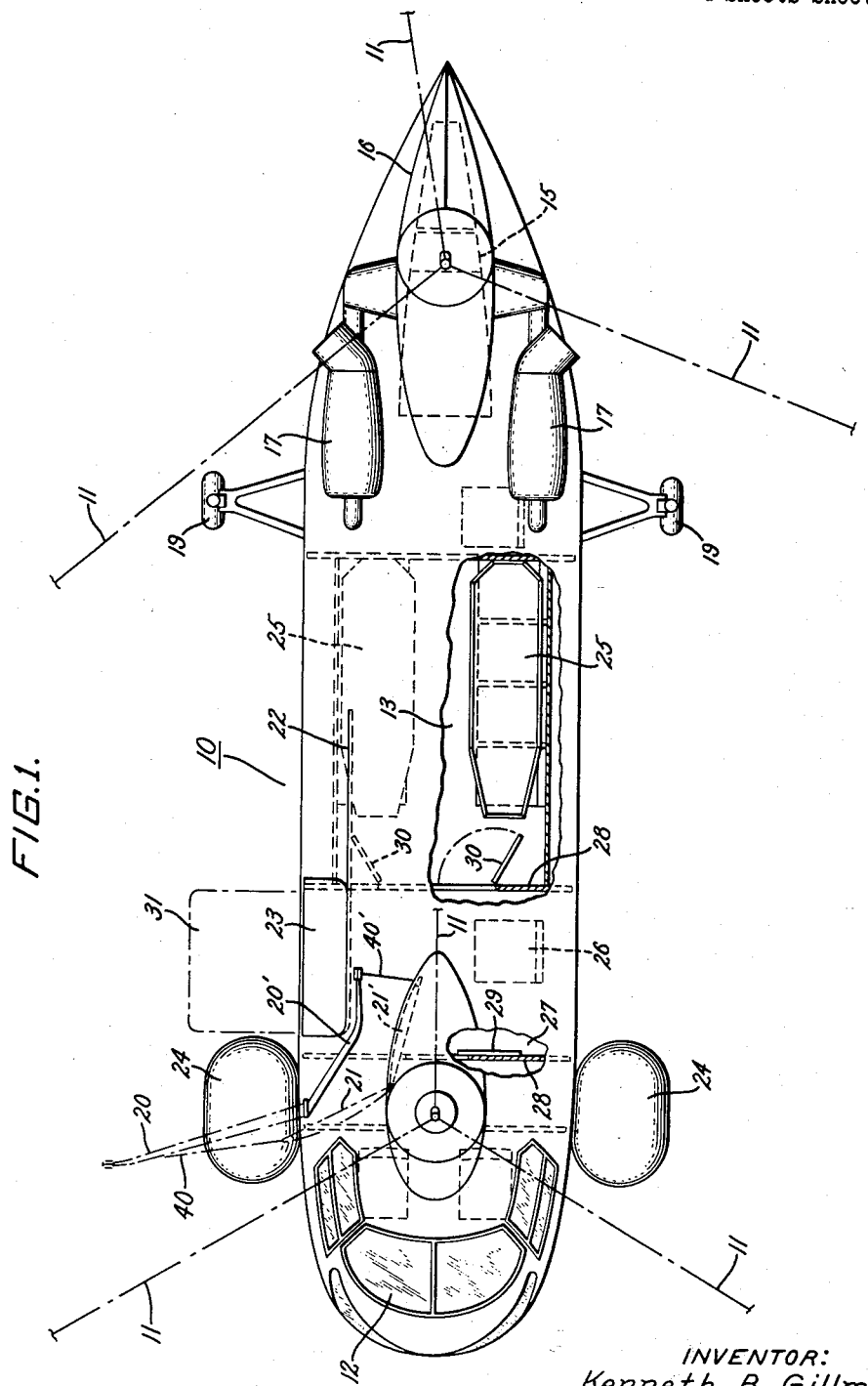
FIGURE 1 shows the plan view of the preferred embodiment of the invention.
Figure 2:
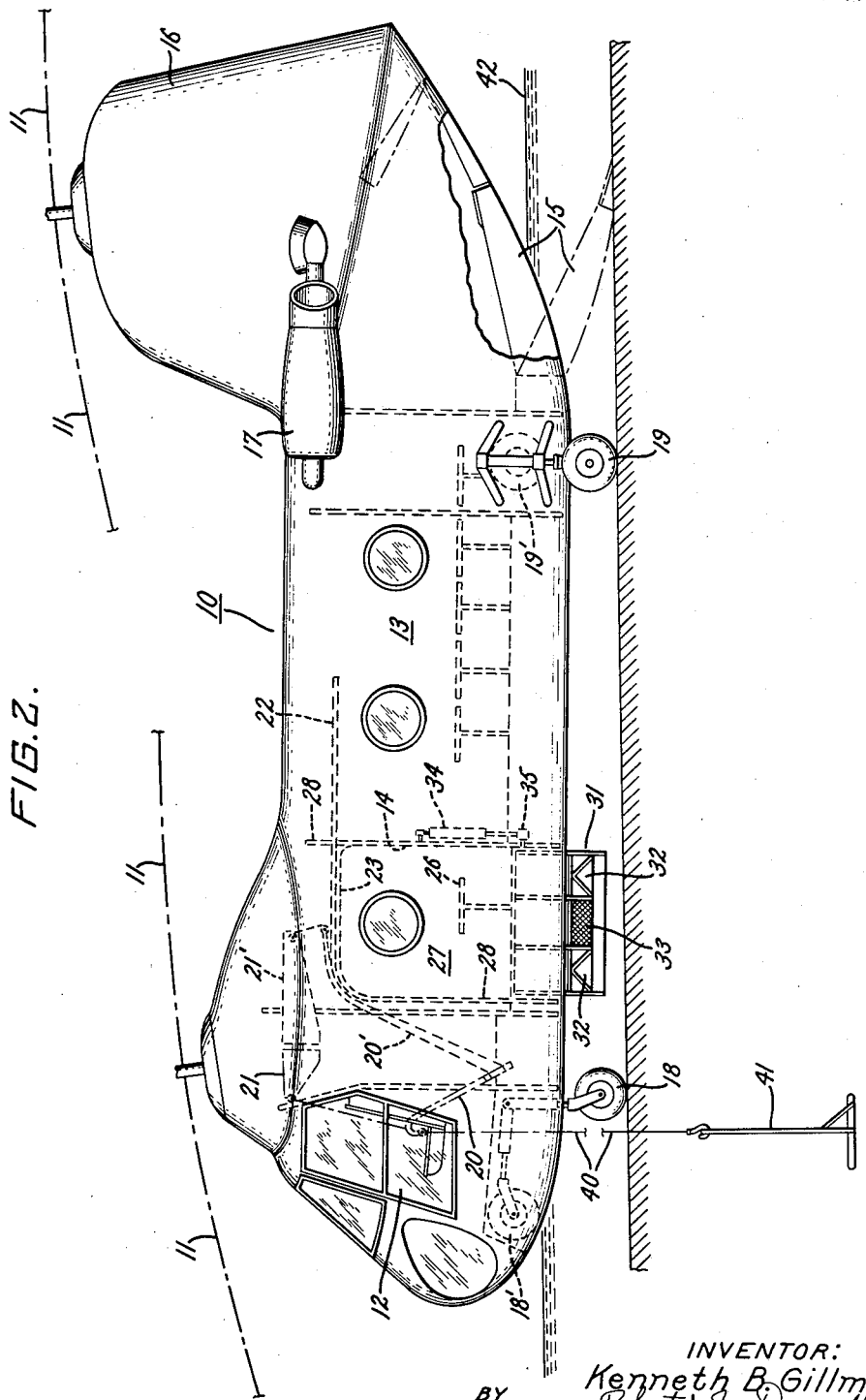
FIGURE 2 shows the side elevation of the vehicle of FIGURE 1 with the rescue compartment entrance on the far side.
Figure 3:
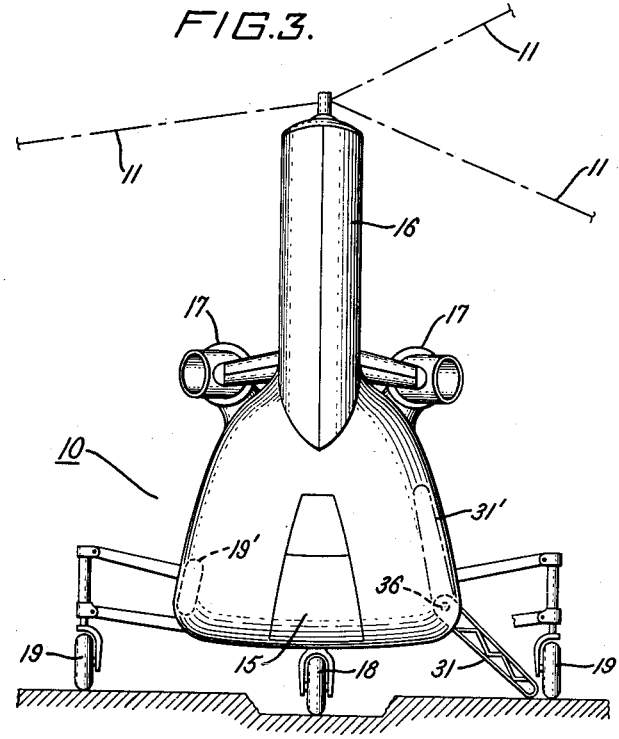
FIGURE 3 is a rear end view of the rescue vehicle.

Referring now to the drawings wherein like reference characters designate like or corresponding parts, there is shown in FIGURES 1 and 2 a helicopter 10 having a pilot's cockpit 12, a main compartment 13 and a rescue compartment 27. The rescue compartment 27 has a doorway 14 which extends at least to the level of the rescue compartment floor and which can be closed during flight by a sliding door 23. The sliding door is maintained open during rescue operations to allow for the bringing aboard of rescued personnel. In FIGURES 1 and 2 it is shown in a closed position.

The rescue compartment 27 is maintained water tight by partitions 28 and water tight doors 29 and 30. The floor level of the water tight compartment is at approximately the same level as the surrounding water when the rescue helicopter has landed in the water. Since the compartment is water tight, it creates no problem when, at times, the compartment floor is somewhat below the level of the surrounding water. A ramp 31 is hinged to the side of the helicopter and functions as a ladder or a scoop for bringing survivors aboard.

Looking at the invention in more detail, the helicopter 10 is comprised of rotor blades 11, a cargo ramp 15, a rear pylon 16, engines 17, and a front landing gear 18 and a rear landing gear 19. The landing gear are shown retracted as 18′ and 19′ in FIGURE 2. The landing gear are made retractable primarily to prevent interference and entanglement of the rescue cables during hovering rescues and to provide a streamline configuration of the ship for increased speed.

As part of the rescue gear of the helicopter, a hinged rescue boom 20, a rescue winch 21 and winch cable 40 are illustrated in phantom in FIGURE 1. This illustrates the boom and winch when in an operating position. The boom and winch are identified as 20′ and 21′ respectively, when shown in a stowed position in FIGURE 1. FIGURE 2 discloses a rescue seat 41 which is typical of a variety of attachments normally attached to the winch cable for hovering rescue efforts. These boom and winch features are old and well known and form no part of the present invention.

In the interior of the main compartment 13 are located litters or stretchers 25 which are used to transport injured personnel picked up in rescue missions. Of course, the stretchers can be readily stowed and the supports used as passenger seats.

A crew seat 26, as shown in FIGURE 2, is shown in the rescue compartment. Along with the crew seat, the rescue compartment would normally contain a variety of collars, baskets and nets (not shown) to allow rescue by winch and cable when conditions dictate such a rescue method. The rescue compartment has a sliding watertight door 29 closing off the pilot's cockpit from the rescue compartment and hinged watertight doors 30 which swing open into the main compartment 13 and close off the main cabin from the rescue compartment. A rail 22 and a fairing 44 (see FIGURE 4) are located above the doorway 14 to provide a support and proper aerodynamic configuration for the sliding door 23 which closes off the doorway 14 when the ship is not engaged in rescue operations.

The ramp 31 comprises an access ladder portion and a rescue platform portion. The ladder portion is identified as section 32 while the platform portion is identified as section 33 in FIGURE 2. The ladder section 32 is used as a normal access means during regular operation. The platform section 33 which is coated with a low friction material provides a ramp type surface allowing ease of entry for injured personnel who are unable to use the ladder portion of the ramp. In construction, the ramp is made up of tubular structural members arranged in a diamond pattern which provides a strong light structure offering low resistance to water and makes it possible to readily lift the ramp by hand, if the need arises.

The ramp 31 is pinned to the fuselage of the helicopter at hinge assembly 35 which hinge assembly is located within the fuselage of the helicopter as is clearly shown in FIGURE 4. A sliding door 43 allows the ramp 31 to move up and down without damaging the body structure of the ship. The sliding door 43 is necessary to insure a smooth aerodynamic configuration condition during normal flight operations. The ramp is splined or in some other manner fixed to the hinge assembly so that the ramp rotates when the hinge assembly is rotated.

Figure 5:
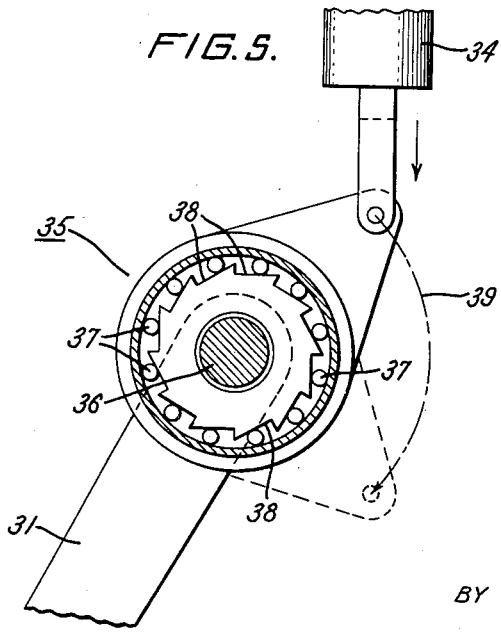
FIGURE 5 is a cross-sectional view of the ramp actuator assembly and linkage.

The hinge assembly 35, as clearly shown in FIGURE 5, consists of a hinge pin 36, a sprag type clutch having rollers 37 and a sprocket 38 and a rotatable housing 39. The sprocket is fixed to the hinge pin 36 by splines or the like so that rotation of the sprocket causes rotation of the hinge pin 36. The rotating housing 39 has an arm extension which provides the lever for causing rotation of the housing 39. The housing, when rotated in the direction shown in FIGURE 5, causes the rollers 37 to transmit the torque through the sprocket 38 to the hinge pin 36. Since the ramp is fixed to the hinge assembly at the hinge pin 36 the ramp 31 is caused to rotate in an upward direction as viewed in FIGURE 4. It should be noted that the housing 39 is actually rotated approximately 90° by a hydraulic actuator, which is described below, which results in the ramp 31 being rotated approximately the same amount. This is satisfactory for accomplishing the rescue, but for purposes of flying and closing door 23, it is desirable that the ramp be completely stowed within the aircraft. The full rotation of the ramp 31, in order to stow it within the aircraft, is readily accomplished by attaching a line such as a rope or the like to the ramp. The crewman can use the line to pull the ramp to an upright position clear of the door 23. The clutch mechanism does not hamper this operation since it acts to hold the ramp in one rotational direction only. A hydraulic actuator 34 is connected to the housing arm 39 and generates the force necessary to rotate the ramp to essentially a horizontal position. The actuator piston is controllable in all positions so that the length of extension of the hydraulic piston is determined by the crewman or pilot by means of a electrical fluid control system (not shown) which controls the supply of fluid to the actuator. This control is conventional and forms no part of the invention. As can be readily seen in FIGURE 5, the ramp 31 can only be rotated from a downward vertical position to an essentially horizontal position or anywhere in-between by means of the hydraulic actuator. The ramp will normally be rotated to a position somewhat above the horizontal when it is to be stowed to expedite raising it the necessary additional amount for stowage.

Emergency floatation gear 24 is located on each side of the craft to give it greater stability in the water if this is deemed necessary. Normally these emergency sponsons will not be needed since the inherent stability of the craft along with the rotor blades are sufficient to maintain the craft upright in the water. But, in high seas or the like the sponsons provide additional floatation and stability characteristics.

In operation, the helicopter locates the survivor and then sets down beside him to effect the rescue. The craft settles in the water to a position identified as the water line 42. This actual water line of the ship, of course, will vary depending on the load in the ship, the density of the water (salt or fresh) and the like. But an average mean water line mark for the ship can readily be determined by computing the displacement of the ship under various loads. Knowledge of the mean water line is necessary to insure that, with average expected loads, the floor of the rescue compartment will be essentially at sea level. Since the compartment is watertight, it does not create problems if the floor level should turn out to be somewhat below the water level due to large loads or use on fresh water. As was noted above, the inherent sea worthiness of the craft gives it stability while the rotors add to this stability and, in addition, give it maneuverability. Of course, the floatation sponsons can be inflated if this is deemed necessary for further stability. As illustrated in FIGURE 4, a crewman would normally be positioned in the rescue compartment 27 in order to aid survivors in coming aboard the craft. As noted above, the doorway opening extends at least to the compartment floor, and the floor of the compartment is located at the mean water level or water line of the ship. The ramp 31 allows the survivor to climb aboard by means of steps 32 in the ramp if he is physically able. If he is injured, he can be virtually slid aboard by being positioned in front of the ramp platform. The ramp is then actuated by means of the actuator 34 resulting in it coming up under and lifting the rescuee to approximately the level of the rescue compartment floor. As can be seen, the amount of movement and lifting required to bring an injured survivor aboard the craft is made virtually negligible. If need be, the crewman can always enter the water himself with a life line around his waist, retrieve the injured survivor, position him in front of the ramp, climb aboard himself and then bring the survivor aboard by actuating the ramp. After bringing the survivor aboard, the crewman merely pulls the ramp on board, slides the door 23 closed and the rescue craft is ready to take the injured rescuee to the hospital.

It should be noted that the concept of using a watertight water line compartment as a rescue chamber in any water-borne vehicle would solve the problem of injury aggravation since a minimum of lifting and dragging would be involved in removing the injured survivor from the water. In a conventional ship, for instance, a watertight compartment could be located at the main water level of the ship with a watertight door closing the compartment entrance from the sea when the ship is underway and being opened when the ship is utilized for rescue activity. A ramp such as disclosed in this disclosure would be useful in such a vehicle also.

The concept of a watertight rescue compartment capable of being opened to the sea and having a ramp designed to aid the survivor in getting aboard the rescue vehicle solves the problem of getting survivors aboard rescue vehicles in a minimum amount of time and with a minimum amount of handling so that the tendency to aggravate injuries from such handling is minimized or eliminated.

It should be understood, of course, that the foregoing disclosure relates to only a preferred embodiment of the invention and that numerous modifications or alterations may be made therein without department from the spirit and scope of the invention as set forth in the appended claims.

I claim:

1. A rescue vehicle for water rescue having a watertight compartment located at the mean water level of the vehicle, said watertight compartment having doorways providing access to the interior of the rescue vehicle and to the exterior of the vehicle, closure means to seal said interior access doorways and make the compartment watertight during rescue operations whereby the survivor to be rescued may enter the rescue vehicle without having to climb or be dragged a significant distance out of the water.

2. A water rescue vehicle having a watertight rescue compartment located at the mean water level of the vehicle, said compartment having access doorways to the interior and exterior of the rescue vehicle, interior closure means for sealing said interior access doorways during the rescue operation and an additional closure means for closing said exterior doorways during normal vehicle operations whereby during rescue operations the rescue compartment may be partially submerged without endangering the rest of the rescue vehicle.

3. A rescue vehicle for water rescue having a rescue compartment at the mean water level of the vehicle so that survivors can be brought aboard the rescue vehicle with a minimum of lifting and climbing thereby providing a speedy and gentle way of rescuing downed personnel, said rescue compartment having access openings for providing ingress from the exterior of the rescue vehicle into the rescue compartment and egress from the rescue compartment into the interior of the vehicle, means for sealing the access openings into the interior of the vehicle during rescue operations so that water entering the exterior access opening will be confined to the rescue compartment.

4. A water rescue vehicle having a watertight compartment located at the mean water level of the vehicle, doorways in said rescue compartment providing access to the interior of the vehicle and to the exterior water surrounding the vehicle, watertight closure means for closing off the doorways leading to the interior of the vehicle during rescue operations, a rescue ramp cooperating with the doorway providing access to the surrounding exterior water to act as an entrance ladder and elevator type platform.

5. The rescue ramp as set forth in claim 4 having a ladder portion and a platform portion, said platform portion having a relatively frictionless coating for expediting the rescue of personnel who are physically unable to climb aboard.

6. The rescue ramp as set forth in claim 5 further comprising a tubular frame which provides a strong lightweight structure having relatively little resistance to movement through the water when being raised and lowered.

7. The rescue ramp as set forth in claim 4 having a hydraulic actuator and a hinge assembly for causing the ramp to operate.

8. A rescue vehicle for water rescue having a watertight compartment located at the mean water level of the vehicle, said rescue vehicle having access openings to the interior and to the exterior of the vehicle, closure means for sealing said interior access doorways during the rescue operation, a rescue ramp attached to the rescue vehicle body by means of a hinge assembly adjacent the access opening to the exterior, a hydraulic actuator connected to said hinge assembly to cause said ramp to raise and lower whereby the ramp can provide aid in bringing downed personnel into the rescue compartment.

9. The rescue ramp as set forth in claim 8 in which the hinge assembly consists of a hinge pin and clutch mechanism mounted on said pin to provide a coupling means between said hydraulic actuator and said ramp.

10. A helicopter, a watertight rescue compartment located at approximately the mean water line of said helicopter, said rescue compartment having access openings to the interior and to the exterior of the helicopter, closure means for sealing the access openings to the interior of the helicopter during rescue operations so that water entering the helicopter during rescue operations cannot spread throughout the ship.

11. A helicopter having a waterproof rescue compartment located at approximately the mean water line of the aircraft, said waterproof compartment having doorways providing access to the interior and exterior of the helicopter, closure means for closing the doorways to the interior of the aircraft during rescue operations, and a hydraulically actuated rescue ramp to aid in gaining access to the watertight rescue compartment during rescue opertions.

12. In a helocopter capable of landing in water, a watertight rescue compartment located at the mean water line of the aircraft, said rescue compartment having access openings to the interior and exterior of the ship, closure means for closing the access openings to the interior of the ship during rescue operations, a pin means, a rescue ramp pinned to the helicopter fuselage by said pin means, adjacent the access opening to the exterior of the rescue compartment, a clutch mechanism mounted on said pin, a hydraulic actuator capable of being positioned and connected to the pin and clutch to cause the ramp to rise enabling the ramp to function as an entrance aid to the rescue compartment.

13. The rescue ramp as set forth in claim 12 having a platform portion and a step portion.

14. The rescue ramp as set forth in claim 13 having a tubular construction to enable it to be light, strong and free of extensive water drag during operation.

15. A rescue helicopter including a fuselage having the ability to land in water, comprising a pilot's cockpit, a main passenger cabin and a watertight rescue compartment located at approximately the mean water level of the helicopter, said rescue compartment having access openings to the pilot's cockpit and the main passenger cabin, closure means for sealing the access openings to the pilot's cabin and the main passenger cabin during rescue operations, and an access opening in the rescue compartment to the exterior of the ship so that survivors can be brought aboard the rescue helicopter with a minimum of climbing, lifting or dragging, a hinge assembly including a pin, a rescue ramp which is pinned by means of said hinge assembly to the helicopter fuselage adjacent the access opening to the exterior of the ship, a hydraulic actuator connected to said hinge assembly capable of actuating said ramp causing it to raise and lower to aid in the rescue of survivors, said connection being in the form of a clutch mounted on said pin and comprising a portion of said hinge assembly.

16. The ramp as set forth in claim 15 having a step ladder portion and a platform portion coated with a relatively frictionless material.

References Cited by the Examiner
UNITED STATES PATENTS

| | | | |
|---|---|---|---|
| 2,070,610 | 2/37 | Myers | 244—17.17 X |
| 2,738,939 | 3/56 | Johnson | 9—14 X |
| 3,037,218 | 6/62 | Brooks | 9—11 |
| 3,065,934 | 11/62 | Jackson | 244—137 X |

FERGUS S. MIDDLETON, *Primary Examiner.*